United States Patent [19]
Lokhoff

[11] Patent Number: 5,633,880
[45] Date of Patent: May 27, 1997

[54] RECEIVER PROVIDING MASKING OF AN ERROR IN A DIGITAL SIGNAL, AND A TRANSMISSION SYSTEM INCLUDING SUCH A RECEIVER

[75] Inventor: Gerardus C. P. Lokhoff, Eindhoven, Netherlands

[73] Assignee: U.S. Philips Corporation, New York, N.Y.

[21] Appl. No.: 231,859

[22] Filed: Apr. 22, 1994

Related U.S. Application Data

[63] Continuation of Ser. No. 703,216, May 20, 1991, abandoned.

[30] Foreign Application Priority Data

Feb. 19, 1991 [NL] Netherlands ............... 9100285

[51] Int. Cl.⁶ ............................................. H03M 13/00
[52] U.S. Cl. .......................................................... 371/31
[58] Field of Search ............................... 371/37.1, 30, 31

[56] References Cited

U.S. PATENT DOCUMENTS

| | | | |
|---|---|---|---|
| 4,464,782 | 8/1984 | Béraud et al. | 381/31 |
| 4,589,130 | 5/1986 | Galand | 381/31 |
| 4,620,311 | 10/1986 | Schouhamer Immink | 375/19 |
| 4,680,766 | 7/1987 | Wilkinson | 371/47 |
| 4,802,171 | 1/1989 | Rasky | 371/43 |
| 4,805,193 | 2/1989 | McLaughlin et al. | 375/27 |
| 4,831,624 | 5/1989 | McLaughlin et al. | 371/31 X |
| 4,864,573 | 9/1989 | Horsten | 371/5.1 |
| 4,896,362 | 1/1990 | Veldhuis et al. | 381/30 |
| 4,907,277 | 3/1990 | Callens et al. | 371/31 X |
| 5,054,025 | 10/1991 | Galand et al. | 371/31 X |
| 5,214,678 | 5/1993 | Rault et al. | 375/122 |
| 5,267,098 | 11/1993 | Lokhoff | 360/50 |
| 5,288,041 | 2/1994 | Yoshino et al. | 371/42 |
| 5,323,396 | 6/1994 | Lokhoff | 370/94.1 |
| 5,365,553 | 11/1994 | Veldhuis et al. | 375/122 |
| 5,367,608 | 11/1994 | Veldhuis et al. | 395/2.38 |

OTHER PUBLICATIONS

EBU Techn. Review No. 230, Aug. 1988. G. Theile et al. "Low bit rate coding of high-quality audio signals" An introduction to the MASCAM system.
Philips Journal of Research 44, 329–343, 1989. R.N.J. Veldhuis et al. "Subband coding of digital audio signals".
IEEE ICASSP 80, vol. 1, 327–331, Apr. 9–11–1980, M.A. Krasner "The critical band coder . . . Digital encoding of speech signals based on perceptual requirements of the auditory system".
Wong, W., et al., "Estimating Unreliable Packets in Subband Coded Speech", *Globecom '90*, pp. 1979–1983.

Primary Examiner—Stephen M. Baker
Attorney, Agent, or Firm—Richard A. Weiss

[57] ABSTRACT

A receiver including an error masking unit for masking an error in a digital signal received by the receiver, and a transmission system including such a receiver. The transmission system includes a transmitter which sub-band codes a wide-band digital signal into sub-band signals having signal blocks containing a predetermined number of samples which the transmitter quantizes and combines with bit allocation information denoting how many bits each of the samples in the signal blocks are quantized by and scale factor information relating to scale factors for the signal blocks into a digital signal. That digital signal is error correction encoded and then applied to a transmission medium by the transmitter. The receiver receives a digital signal from the transmission medium which substantially corresponds to the digital signal applied to the transmission system by the transmitter and decodes that digital signal so as to produce a replica of the wide-band digital signal encoded by the transmitter. The error masking unit is used during decoding for error masking information having uncorrected errors. The error masking unit is capable of masking an uncorrected error pertaining to the quantized samples, the bit allocation information, the scale factor information and/or sync information included in the digital signal received by the receiver.

20 Claims, 3 Drawing Sheets

RECEIVER PROVIDING MASKING OF AN ERROR IN A DIGITAL SIGNAL, AND A TRANSMISSION SYSTEM INCLUDING SUCH A RECEIVER

This is a continuation of prior application Ser. No. 07/703,216, filed May 20, 1991 now abandoned.

BACKGROUND OF THE INVENTION

The present invention relates to a digital transmission system, comprising a transmitter for transmitting to a transmission medium a digital signal representing a wideband digital signal having a specific sampling frequency $F_s$ and a bandwidth, and a receiver for receiving from the transmission medium a digital signal substantially corresponding to the digital signal representing the wide-band digital signal. The present invention also relates directly to the receiver.

Such a transmitter comprises (a) a first encoder unit for receiving the wide-band digital signal, the first encoder unit including (i) a sub-band coder unit for splitting up the bandwidth of the wide-band digital signal into M successive sub-bands which augment with frequency (each sub-band having a band number m, where m is an integer such that $1 \leq m \leq M$), and generating M sub-band signals having reduced sampling frequencies in response to the wide-band digital signal, each sub-band signal being made up of consecutive signal blocks which each contain q samples of that sub-band signal; (ii) a quantization unit for quantizing the samples in the signal blocks of the sub-band signals to produce quantized samples in the signal blocks; and (iii) a bit allocation unit for generating bit allocation information denoting how may bits the q samples in a signal block are quantized by; (b) a scale factor information generating unit for generating scale factor information relating to a scale factor for a signal block; (c) a combining unit for combining the quantized samples in the signal blocks, and the bit allocation information and the scale factor information relating thereto in successive frames of a second digital signal; (d) a second encoder unit for converting the second digital signal into a third digital signal which is error correction encoded; and (e) an application unit for applying the third digital signal to the transmission medium.

Such a receiver comprises (a) a receiving unit for receiving a replicated third digital signal from the transmission medium which substantially corresponds to the third digital signal applied thereto; (b) an error correction unit for correcting errors in and converting the replicated third digital signal into a replicated second digital signal which substantially corresponds to the second digital signal; (c) a control signal generating unit for generating a control signal if an error exists in the replicated third digital signal which cannot be corrected when the fourth digital signal is converted into the replicated second digital signal in the error correction unit; (d) an error masking unit for processing the replicated second digital signal in response to the control signal; (e) a derivation unit for deriving the quantized samples in the signal blocks of sub-band signals and the bit allocation information and the scale factor information relating thereto from frames of the replicated second digital signal to produce replicated samples in the signal blocks which substantially correspond to the original samples in the signal blocks of the sub-band signals; and (f) a synthesis filter unit for constructing a replica of the wide-band digital signal in response to the samples in the signal blocks.

A transmission systems of the type mentioned above is know from European Patent Application No. 402.973, which corresponds to U.S. Pat. No. 5,323,396. In such prior art receivers, if the received information contains one or more errors which cannot be corrected (i.e., one or more uncorrected errors), those errors are replaced by information obtained (i.e., error masking occurs) from interpolation of the received information. Separate interpolation circuits are necessary to enable application of such interpolation.

SUMMARY OF THE INVENTION

It is an object of the present invention to provide a receiver and a transmission system having a receiver in which error masking can be realized in a simple manner. For this purpose, the receiver and the transmission system having a receiver according to the invention are characterized in that an error masking unit contained therein is arranged for allocating a zero amplitude to a quantized sample, or a replicated sample produced therefrom, for which a first control signal indicating an uncorrected error in that quantized sample is generated by a control signal generating unit.

The present invention is based on the recognition that if there is an uncorrected error in a sample in a signal block in a frame a prior-art interpolation circuit determines a mean value from at least the directly preceding and the directly successive sample in that signal block, and that mean value takes the place of the sample having the uncorrected error. This requires additional storage capacity and an additional averaging operation.

However, in accordance with the present invention, by assigning a zero amplitude to a quantized sample, or a replicated sample produced therefrom, having an uncorrected error, there is no need for additional storage capacity and another averaging operation. Because the samples are applied to a synthesis filter unit after error masking, an averaging of the successive samples is effected in the synthesis filter unit. As a result, an interpolator in which additional averaging is effected is unnecessary.

The receiver according to the invention may further be characterized in that the error masking unit is arranged for replacing an uncorrected scale factor for a signal block with an extrapolated value from scale factors for one or more preceding signal blocks of the same sub-band signal when a second control signal indicating an corrected scale factor is generated. The error masking unit preferably replaces the uncorrected scale factor with the scale factor for the signal block of the same sub-band signal preceding the signal block having the uncorrected scale factor, when the second control signal is generated.

In prior-art interpolation circuits, an uncorrected scale factor is replaced with the mean value of the scale factors for the directly preceding and directly successive signal blocks of the same sub-band signal from which the signal block having the uncorrected scale factor is from. This requires additional storage capacity for storing the scale factors for the directly preceding and directly successive signal blocks. Furthermore, an additional averaging operation is necessary.

If the uncorrected scale factor is replaced with the scale factor for the signal block of the same sub-band signal preceding the signal block having the uncorrected scale factor, however, as is the case with the present invention, only additional storage capacity is necessary for storing the scale factor for the preceding signal block. No further averaging is necessary.

The receiver may further be characterized in that the error masking unit reiterates the information stored in the preceding frame, reproduces the replicated samples produced therefrom, if the control signal generating unit generates a third control signal for a frame indicating that there is an uncorrected error in the bit allocation information for that frame, and it has not generated a third error signal for the preceding frame. If there is an uncorrected error in the bit allocation information of a frame, the receiver will no longer be capable of deriving different sorts of information from that frame. In that case, the information of the preceding frame, or the replicated samples produced therefrom, is/are repeated.

If a third control signal is also generated for a successive frame, a zero amplitude is assigned to the quantized samples in that frame, or replicated samples having zero amplitudes are produced from those quantized samples. In addition, because the synthesis filter unit also performs an averaging operation, the output signal of the synthesis filter unit may be zeroed in a slow manner.

The receiver may further be characterized in that the error masking unit is arranged for assigning a zero amplitude to all of the quantized samples in the signal blocks in a frame, or causing replicated samples having zero amplitudes to be provided in all of those signal blocks, if the control signal generating means generates a fourth control signal, indicating that the synchronization ("sync") signal for a frame has an uncorrected error, for that frame and for the frame directly preceding it. If the sync signal for a frame appears to have an uncorrected error, whereas the sync signal of the preceding frame did not, the fourth control signal will be generated because, at that moment, it is assumed that there is a unique uncorrected error in the sync signal. If the successive frame also turns out to contain an uncorrected error in its sync signal, it is assumed that synchronization in the receiver is lost. During the period of time in which attempts are made to lock on to the sync signals, the quantized samples, or the replicated sample produced therefrom, of the next frame and any frames after that frame are set to zero. The synthesis filter unit again provides a slow zeroing of the output signal.

BRIEF DESCRIPTION OF THE DRAWINGS

The invention will be further explained in accordance with the following drawing, in which.

DESCRIPTION OF THE PREFERRED EMBODIMENT

Figure 1A:
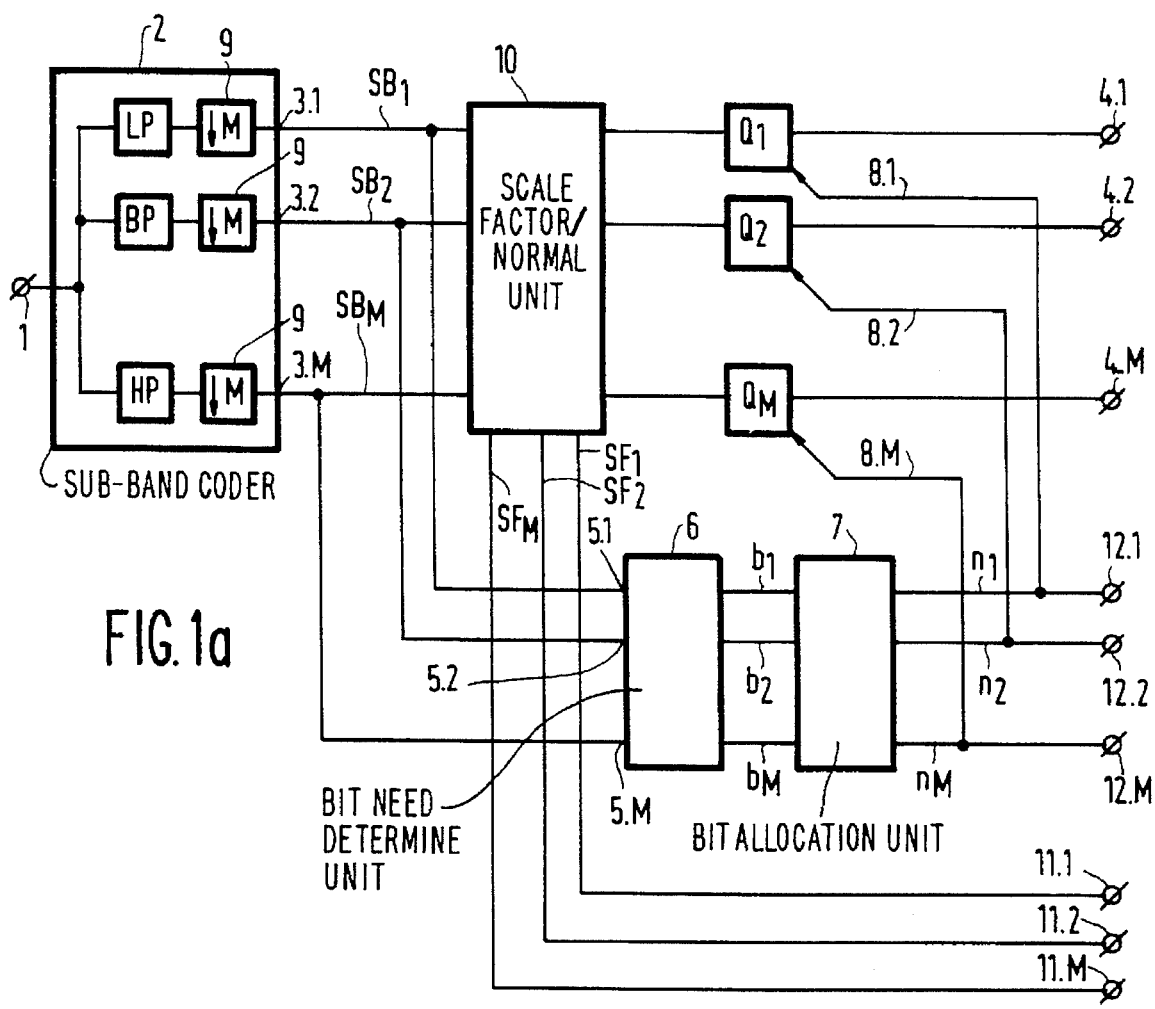
FIGS. 1a and b show a transmitter for a transmission system.

FIG. 1a show a first encoder unit of a transmitter. An input terminal 1 thereof is supplied with a wide-band digital signal. Such a wide-band digital signal may be an audio signal having a bandwidth of about 20 kHz. The audio signal, in turn, may be a stereo audio signal. For such a case, the discussion which follows primarily addresses only one of the two signal portions (i.e., the left or right signal portion) of the stereo audio signal. For example, it may be assumed that input terminal 1 is supplied with 16-bit samples of, for example, the left signal portion of an audio signal having a 44 kHz sampling frequency. The other signal portion will also be subject to the same process.

The audio signal (for the left signal portion, for example) is applied to a sub-band coder 2 comprising analysis filters.

The sub-band coder 2 distributes the audio signal over M sub-bands by means of M analysis filters, i.e., a low-pass filter LP, M−2 bandpass filters BP, ..., and a high-pass filter HP to produce M sub-band signals. M may be equal to, for example, 32. The sample frequencies of the M sub-band signals are reduced in the blocks referenced 9. In such a block 9, the sample frequency of a sub-band signal is reduced by a factor of M.

The sub-band signals, thus, obtained are available at the outputs 3.1, 3.2, ... 3.M of the sub-band coder 2. The sub-band signal available at the output 3.1 is the sub-band signal for the lowest sub-band $SB_1$. The sub-band signal at the output 3.2 is the sub-band signal for the next to lowest sub-band $SB_2$. The sub-band signal available at the output 3.M is the sub-band signal for the highest sub-band $SB_M$.

The sub-band signals at the outputs 3.1 to 3.M of the sub-band coder 2 each have the form of successive samples expressed in at least 16-bit numbers, for example, 24-bit numbers. In the present exemplary embodiment, the sub-bands $SB_1$ to $SB_M$ have bandwidth which are all equally wide. However, this is not necessary. An article by M. A. Krasner entitled "The Critical Band Coder ... Digital Encoding of Speech Signals Based On Perceptual Requirements of the Auditory System", IEEE ICASSP 80, Vol. 1, pg 327–331, Apr. 9–11, 1980, proposes a subdivision into a plurality of sub-bands whose bandwidths approximately correspond to the bandwidths of the critical bands of the human auditory system in the respective frequency areas.

The operation of the sub-band coder 2 will not be further explained herein because the operation thereof has already been extensively discussed. For this purpose, reference is made to the above-mentioned Krasner article and U.S. Pat. Nos. 4,896,386 and 5,214,678 which are incorporated herein by reference.

The sub-band signals are each made up of consecutive signal blocks of q successive samples, for example, q may equal 12, and applied to associated quantizers $Q_1$ to $Q_M$, respectively. In a quantizer $Q_M$, the samples of a sub-band signal are quantized to provide quantized samples each having a number of bits $n_m$, which is smaller than 16.

FIG. 1a shows how the left sub-band signals (in signal blocks of q successive samples) are each applied to an associated quantizer $Q_m$ for quantizing. In a like manner, the right sub-band signals (in signal blocks of q successive samples) are each applied to an associated quantizer (not shown). During the quantization process, the signal blocks (groups) of q successive samples of the sub-band signals are each quantized to a smaller number of bits.

Prior to quantization, the q samples in each signal block are first normalized. This normalization is effected in a scale factor/normalization generating unit 10 by dividing the amplitudes of the q samples in a signal block by the amplitude of the sample having the largest absolute value in that signal block. The amplitude of the sample having the largest amplitude in a signal block of the sub-band signal having sub-band $SB_m$ produces a scale factor $SF_m$. See European Patent Application No. 402.973, which corresponds to U.S. Pat. No. 5,323,396, and is incorporated herein by reference. Subsequently, the amplitudes of the normalized samples, which are now situated in an amplitude range from −1 to +1, are quantized. The quantized samples of the sub-band signals in the sub-bands $SB_1$ to $SB_M$ are then presented at the respective outputs 4.1 to 4.M.

The outputs of 3.1 to 3.M of sub-band coder 2 are also coupled to respective inputs 5.1 to 5.M of a bit need determining unit 6. The bit need determining unit 6 determines for time-equivalent q-sample signal blocks of the sub-band signals in the sub-bands $SB_1$ to $SB_M$ a bit need $b_m$ for each of those signal blocks. The bit need $b_m$ is a number which bears a proportional relationship to the number of bits with which the q samples in a q-sample signal block of a sub-band signal should be quantized.

The bit needs $b_1$ to $b_M$ derived by the bit need determining unit 6 are applied to a bit allocation unit 7. The bit allocation unit 7 determines the actual number of bits $n_m$ to $n_M$ with which each of the q samples in the corresponding (i.e. time-equivalent) signal blocks of the sub-band signals in the sub-bands $SB_1$ to $SB_M$ are to be quantized, respectively, on the basis of the bit needs $b_1$ to $b_M$ therefor. Control signals corresponding to the numbers $n_1$ to $n_M$ are applied to the respective quantizers $Q_1$ to $Q_M$ over the lines 8.1 to 8.M, so that the quantizers are capable of quantizing the samples with the correct number of bits. Dutch Patent Applications Nos. 90.01.127 and 90.01.128, which correspond respectively to U.S. Pat. Nos. 5,367,608 and 5,365,533, and are incorporated herein by reference, extensively discuss the operation of the bit need determining unit 6 and the bit allocation unit 7.

The quantized samples in the signal blocks of the sub-band signals are thereafter applied to inputs 4.1 to 4.M of a signal combining unit 14. See FIG. 1b. In a like manner, bit allocation information, formed generally from conversion of the numbers $n_1$ to $n_M$, is applied to the inputs 12.1 to 12.M of the combining unit 14. In addition, scale factor information, generally formed from conversion of the scale factors $SF_1$ to $SF_M$, is applied to the inputs 11.1 to 11.M of the combining unit 14.

Figure 1B:
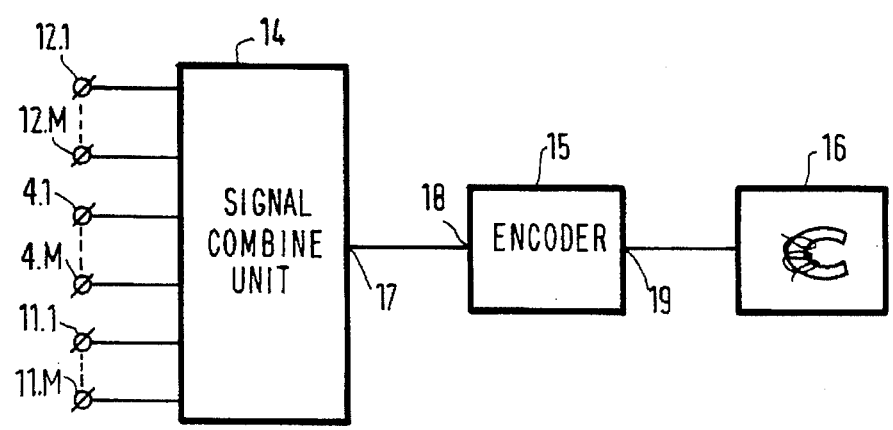

FIG. 1b shows a second section of the transmitter, which section includes the combining unit 14, a second encoder 15 and a unit 16 for applying the signal presented at its input to a transmission medium. In the preferred embodiment, the transmission medium is a magnetic record carrier.

In addition to the quantized samples, the bit allocation information and the scale factor information for the left signal portions, the quantized samples, the bit allocation information and the scale factor information for the right signal portions are applied to the combining unit 14. The combining unit 14 combines the signal portions and the information relating thereto, and accommodates them in successive frames of a second digital signal available at an output 17 of the combining unit 14.

Figure 2:
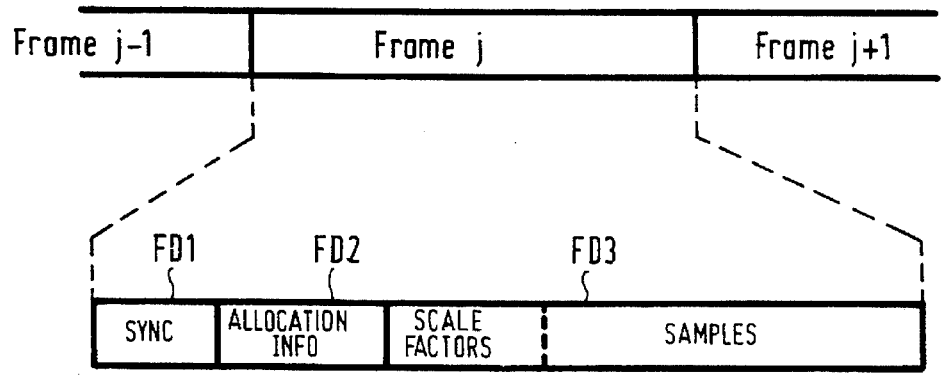
FIG. 2 shows a second digital signal generated by the transmitter.

FIG. 2 shows the format of the second digital signal. (This format is extensively discussed in European Patent Application No. 402.973.) FIG. 2 shows a second digital signal having successive frames j−1, j, j+1 and the format of frame j. According to FIG. 2, frame j comprises a first frame portion FD1 in which sync information is contained; a second frame portion FD2 in which the bit allocation information is contained; and a third frame portion FD3 in which the scale factor information and then the quantized samples of the sub-band signals are contained. (For a further description of the second digital signal reference is made to European Patent Application No. 402.973.)

The second digital signal is applied to an input 18 of the second encoder 15 of FIG. 2. In this encoder, the second digital signal is further encoded such that at the receiver end error correction of the received information is possible. For this purpose, for example, a Reed solomon encoding and possibly an interleaving is used by the second encoder 15 in encoding the second digital signal. In addition, the second digital signal is encoded by the second encoder 15 in such a way that the information to be transmitted is suitable for transmission through the transmission medium. Therefore, for example, an 8-to-10 encoder can be used for 8-bit words making up the second digital signal. Such an 8-to-10 conversion is described, for example, in European Patent Application 0.150.082, corresponding to U.S. Pat. No. 4,620,311. During this conversion 8-bit information words are converted to 10-bit code words.

As a result of the encoding of the second digital signal, a third digital signal is obtained, and it is available at an output 19 of the encoder 15 of FIG. 2. The output 19 is coupled to an input 20 of the unit 16, which can be a recording unit for recording the third digital signal on a magnetic record carrier.

Figure 3:
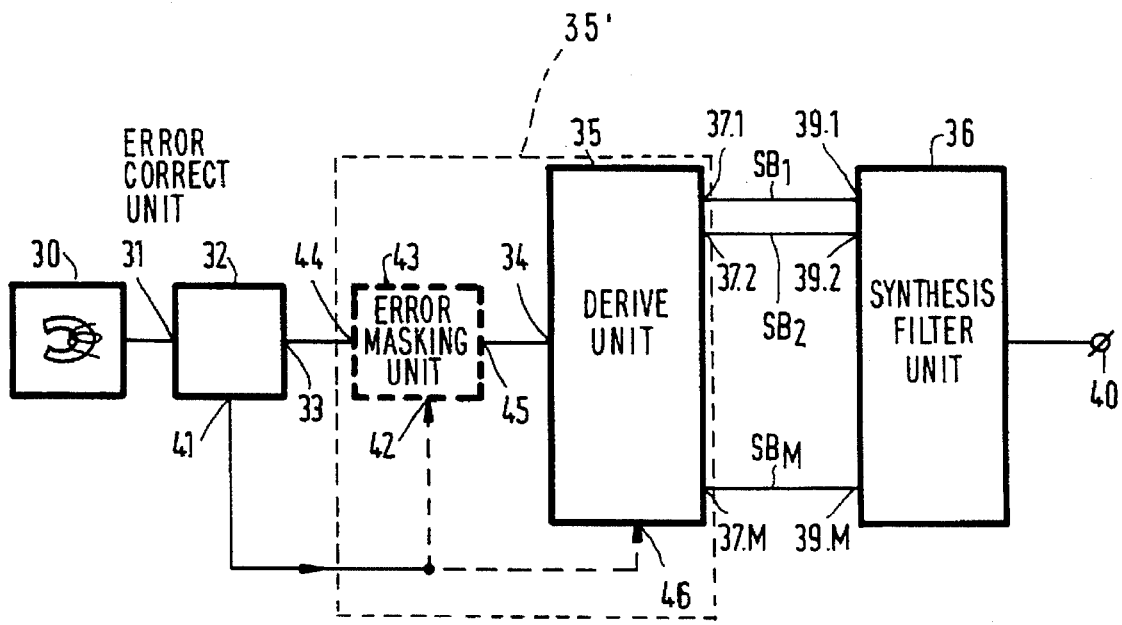
FIG. 3 shows an embodiment of a receiver according to the invention.

FIG. 3 shows a diagram of an embodiment of the receiver according to the present invention. The receiver comprises a receiving unit 30 for receiving a fourth replicated third digital signal from the transmission medium which substantially corresponds to the third digital signal applied thereto. In this case, the receiving unit 30 has the form of a read unit for reading information from a magnetic record carrier. The read-out of the replicated third digital signal is applied to an input 31 of an error correction unit 32. In the error correction unit 32, first 10-to-8 conversion is performed, and then an error correction operation is carried out and possibly de-interleaving of the information that has been read out. As a result of the decoding carried out by the error correction unit 32, a replicated second digital signal, substantially corresponding to the second digital signal represented in FIG. 2, is obtained, and it is available at an output 33 thereof.

The fifth digital signal is applied to an input 34 of a derivation (hereinafter derive) unit 35 of FIG. 3 which derives from (the frames as shown in FIG. 2 of) the replicated second digital signal the bit allocation information, the scale factor information and the quantized samples in each signal block of each sub-band signal. After dequantization of the quantized samples and multiplication by the appropriate scale factors to obtain replicated original samples (discussed below) which substantially correspond to the original samples in the signal blocks of the sub-band signals, replicas of the sub-band signals for the sub-bands $SB_1$ to $SB_M$ are derived, and they are available, respectively, at outputs 37.1 to 37.M of the derive unit 35.

The replicas of the sub-band signals are then applied to inputs 39.1 to 39.M of synthesis filter 36, respectively, which restores a wide-band digital signal which substantially corresponds to the wide-band digital signal originally encoded from the replicas of the sub-band signals. The operation of the synthesis filter unit 36 is extensively discussed in U.S. Pat. No. 5,214,678. The restored wide-band digital signal (i.e., a replica of the original wide-band digital signal) is applied by the synthesis filter 36 to an output 40 of the receiver. (It should be noted that this discussion has (as before) primarily pertained to only one of the two stereo signal portions, for example, the left signal portion of the restored wide-band digital signal. The derive unit 35 may have M additional outputs at which replicas of the sub-band signals of the right signal portion are available. A synthesis filter unit (not shown) such as the synthesis filter unit 36 is available for restoring a wide-band digital signal corresponding to the original right signal portion from those replicas of the sub-band signals.)

Any errors occurring in the information obtained by the receiver are detected and corrected in the error correction unit 32. If an error turns out not to be correctable (i.e., an uncorrected error), error correction unit 32 will generate an error flag at an output 41. This error flag is applied to a control signal input 42 of an error masking system 43. Such an error masking system 43 may be arranged between the correction unit 32 and the derive unit 35 as is shown in FIG. 3. As a result, error masking in response to an error flag of the correction unit 32 is performed on the replicated second digital signal. The moment an error flag of the unit 32 occurs indicates to the error masking system 43 which information word in the serial data stream of the fifth digital signal (having the same formate as that of FIG. 2) is erroneous (i.e., has an uncorrected error.). The error masking system 43 operates as follows.

If an error flag is generated denoting that a quantized sample in the third frame portion $FD_3$ is erroneous (i.e., has an uncorrected error), the error masking system 43 replaces the erroneous quantized sample with an information word having a zero amplitude. This in turn will cause one of the signal blocks of a replica of a sub-band signal, as it is applied to the synthesis filter unit 36 by the derive unit 35, to contain a zero amplitude sample. As a result of the filter characteristic of the synthesis filter unit 36, there will be an automatic interpolation over a number of successive samples in the same signal block as the erroneous quantized sample existed. The error masking system 43 does not require a separate interpolator in which the mean value of the preceding and an successive sample is to be determined to replace the erroneous sample.

If an error flag is generated denoting that a scale factor $SF_m$ for a signal block of a sub-band signal in the sub-band $SB_m$ is erroneous (i.e., has an uncorrected error), the error masking system 43 will replace the erroneous scale factor $SF_m$ with an information word having the same values as the scale factor $SF_m$ for the signal block of the same sub-band signal in sub-band $SB_m$ preceding the signal block having the erroneous scale factor $SF_m$. In the case of the signal format as described with reference to FIG. 2 and European patent Application No. 402.973, which describes each frame as containing the quantized samples of one time-equivalent signal block for each of the sub-band signals and the scale factor and the bit allocation information relating thereto the replacement scale factor information is taken from the preceding frame j–1. Another option would be to replace the erroneous scale factor $SF_m$ with a value obtained from extrapolation of, for example, the weighted average of two or more scale factors $SF_m$ belonging to signal blocks of the same sub-band signal in the sub-band $SB_m$ preceding the signal block having the erroneous scale factor $SF_m$.

If an error (i.e., an uncorrected error) is found in the bit allocation information of frame j, and no error flag was generated for the bit allocation information for the preceding frame j–1 indicating an error in the bit allocation information therein, the masking system 43 will reiterate the previous frame j–1. If, however, an error had already been detected in the bit allocation information of frame j–1 (as indicated by an error flag), a zero amplitude information word will be allocated to all of the quantized samples in the frame j. As a result of the filtering function of the synthesis unit filter 36, another interpolation is performed automatically so that the output signal will not abruptly go to zero when an error is detected in the bit allocation information for a number of successive frames.

If an error (i.e., an uncorrected error) is detected in the sync signal in the first frame portion FD1 of the frame j (as indicated by an error flag), and no error is detected in the sync signal of the frame j–1, the masking system 43 will not react. However, if the sync signal in the frame j–1 also appears to be erroneous, synchronization is assumed to be lost. In that case, as in the preceding case, an information word corresponding to the zero amplitude will be allocated to all of the quantized samples in the frame j.

In the foregoing, the error masking was performed on information in the replicated second signal, such as the information included in the second digital signal, i.e., the quantized samples, the scale factor information and the bit allocation information. Another option is to perform error masking of the information as it is derived from the replicated second digital signal by the derive unit 35 to produce the replicas of the sub-band signals. In this case, the error flags are applied to a control signal input 46 of the derive unit 35 through the output 41. The error masking system 43 as represented in FIG. 3 will not be a separate unit, but rather, will be incorporated in the derive unit 35 which will be referenced 35'. A further explanation of unit 35' is provided below with reference to FIG. 4.

Figure 4:
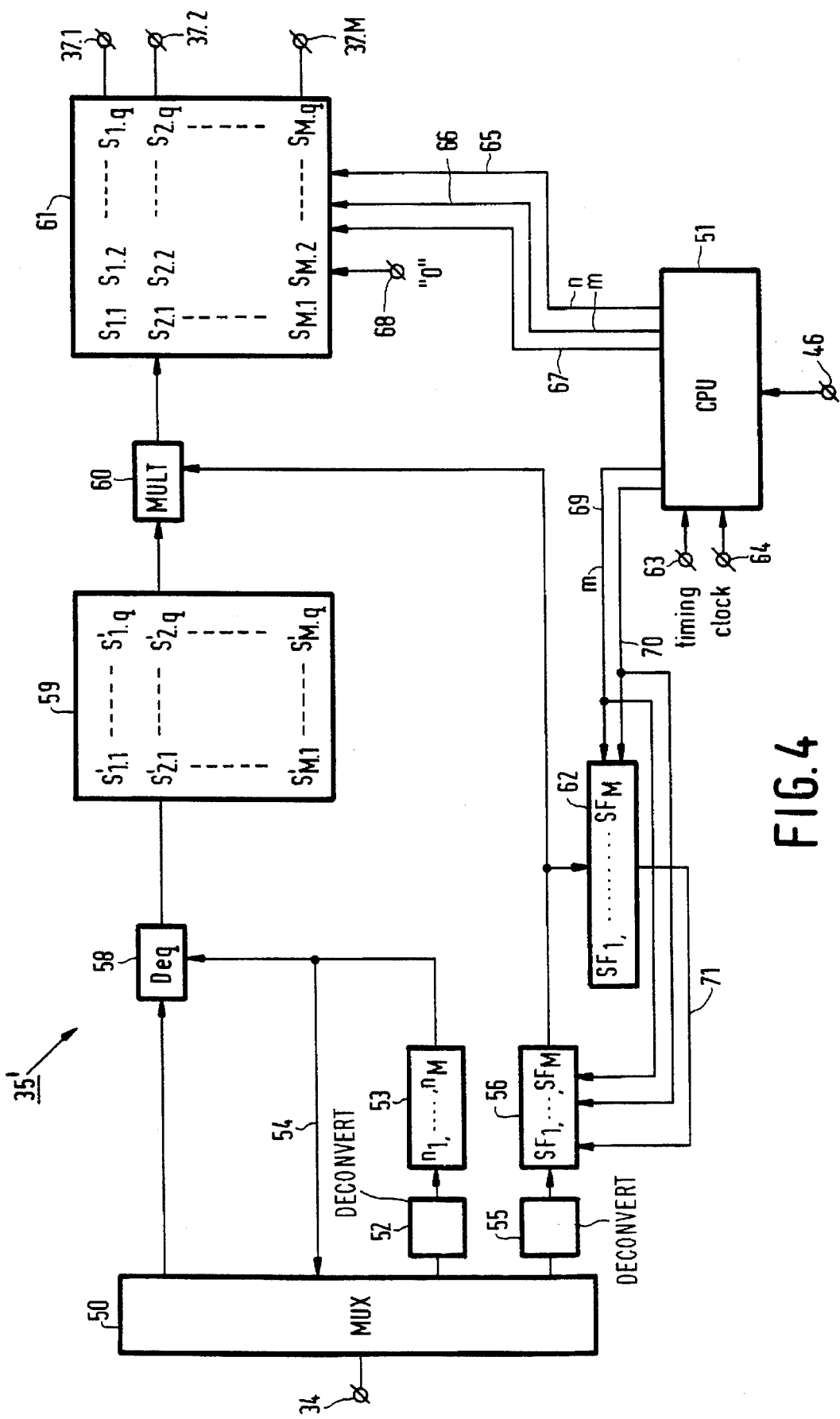
FIG. 4 shows an embodiment of an error masking unit.

FIG. 4 shows that the input 34 of unit 35' is coupled to a input of a multiplexer 50. In response to control signals (not shown) produced by a central processing unit 51, from a serial data stream of the replicated second digital signal, the bit allocation information is derived from the second frame portion FD2 of the frames.

For purposes of this discussion, in each frame of the replicated second digital signal there are the quantized samples, the scale factor information and the bit allocation information associated with one signal block of each of the signals in the sub-bands, see European Patent Application No. 402.973. The bit allocation information is converted into a series of numbers $n_1$ to $n_M$ in the deconverter 52, which numbers denote the number of bits with which each of the quantized samples in each signal block of each sub-band signal in the various sub-bands have been quantized, respectively. These numbers are stored in a memory 53. The bit allocation information stored in the memory 53 is necessary for deriving the scale factors and dequantized samples of the serial data stream from the replicated second digital signal. This is diagrammatically shown by means of line 54 over which this information is transported to the multiplexer 50.

The multiplexer 50 is capable of deriving the scale factor information from the third frame portion FD3, and after deconversion in the deconverter 55, the scale factors $SF_1$ to $SF_M$ can be stored in a memory 56. In addition, the multiplexer 50 can derive the quantized samples from the third frame portion FD3 of the replicated second digital signal and apply them to a de-quantizer 58 which, in turn, derives the bits of the serial data stream that belong together as indicated by the allocation information. After dequantization of the quantized samples to detain dequantized normalized samples (for example to samples $S'_{m,1}$, $S'_{m,q}$, in a signal block of a sub-band signal in the sub-band $SB_m$), these dequantized normalized samples are applied to a memory 59 and stored there.

FIG. 4 diagrammatically shows the contents of the memory 59 in the case where a single frame has been decoded in the manner described above. The memory will contain a single signal block of each of the sub-band signals (which could include both the left and the right signal portions) in all the sub-bands. The dequantized normalized samples are then applied to a multiplier 60 which multiplies those samples by their associated scale factors. A replica of original samples (i.e., replicated original samples) in the signal blocks of the sub-band signals (for example, samples $S_{m,1}$ to $S_{m,q}$ in a signal block of a sub-band signal in a sub-band $SB_m$) are then stored in a memory 61. Through the outputs 37.1 to 37.M the replicas of the sub-band signals are then applied to the synthesis filter unit 36.

If a single frame is decoded in the manner described above, the scale factor information from memory 56 will be stored in a memory 62. Subsequently, the next frame will be decoded. As a result, the scale factor information for the next frame is stored in the memory 56, the bit allocation information in the memory 53 and the samples in the memories 59 and 61.

The error masking system 43 of the unit 35' is made up of a section of the central processing unit 51, the memory 62 and a memory 61. The control signal input 46 (through which the error flags enter) is coupled to the central processing unit 51. The central processing unit 51 is also supplied with timing information through an input 63, and clock signals through an input 64. The timing signals and the clock signals are generated internally, the timing signals being derived from the replicated second digital signal by means of a sync unit (not shown). In tandem with the timing signals and the clock signals, the central processing unit 51 is capable of ascertaining in which information component an error (i.e., an uncorrected error) occurs when there is an error flag.

If an error flag is generated denoting that one of the dequantized normalized samples in the memory 59 is erroneous (i.e., has an uncorrected error), the central processing unit 51 generates on the lines 65 and 66 an address n,m denoting the location in the memory 61 at which an erroneous replicated original sample will be stored after processing in multiplexer 60. The sub-band is m and n is the erroneous $n^{th}$ sample in the signal block of the sub-band signal in the sub-band m. The central processing unit 51 further applies a write signal via line 67 to the memory 61 so that the value zero, applied to an input 68 of the replicas of the memory 61, is written at the memory location n,m.

If an error flag denoting that a scale factor $SF_m$ is erroneous (i.e., has an uncorrected error) is applied to input 46, the central processing unit 51 generates an address m on line 69 and a control signal on line 70. The two signals are applied to the memories 56 and 62. In response to those signals, the memory 62 will apply the value of the scale factor $SF_m$ stored in the memory 62, which corresponds to the scale factor $SF_m$ of the previous frame (i.e., the previous signal block of the same sub-band signal), over the line 71 to an input of the memory 56. Memory 56 will then store this value as the scale factor at the memory location for the scale factor $SF_m$ in its memory. As a result, the dequantized normalized samples $S'_{m,1}$ to $S'_{m,q}$, in the multiplier 60 are multiplied by the scale factor $SF_m$ from the previous frame to replace the replicated original samples $S_{m,1}$ to $S_{m,q}$.

In an error flag denoting that there is an error (i.e., an uncorrected error) in the bit allocation information in a frame is generated, the multiplexer 50 will no be longer capable of correctly deriving the scale factors and the quantized samples from that frame. If the allocation information of the preceding frame is correct, the central processing unit 51 will cause the decoding of the frame to stop and the contents of the memory 61 will be read out once more to the outputs 37.1 to 37.M. Subsequently, the next frame will be decoded. However, if in the preceding frame the allocation information appeared not to be correct, the central processing unit 51 will generate a write signal on line 67 and all of the addresses from 1.1 to M.q of the memory locations in the memory 61. As a result, a zero amplitude will be stored at all the memory locations in memory 61. Thus all of the replicas of the signal blocks of the sub-band signals in the sub-bands whose samples where stored in memory 61 will contain samples having a zero amplitude (this can be for both the left and for the right signal portions.)

If an error (i.e., an uncorrected error) is detected in the sync signal of the frame j as indicated by an error flag, whereas no error is detected in the sync signal of the frame j−1, the central processing unit 51 will continue to decode the information of the frame in the manner described above. If, however, the sync signal of the frame j+1 is also erroneous, the memory 61 will be filled with zero amplitude replicated original samples in the manner described above.

It should again be observed that the present invention is largely described with respect to monosignal coding and transmission. However, the invention is not restricted to this application. The invention may likewise be applied to stereo signal coding, in which each sub-band has two signal sub-band signal portions, i.e., a left and a right portion. The invention may also be applied to coding arrangements in which one or more of the sub-band signals may be coded in a stereo intensity mode. For an explanation of the intensity mode coding, reference is to European Patent Application No. 402.973 and Dutch Patent Application No. 91.00.73.

I claim:

1. A receiver, comprising:

receiving means for receiving a first digital signal representing a wide-band digital signal which has been encoded into sub-band signals which are each made up of successive signal blocks having a predetermined number of samples of that sub-band signal, the samples in the signal blocks of the sub-band signals having been quantized to produce quantized samples in the signal blocks;

error correction means for correcting errors in and converting the first digital signal into a second digital signal having signal information, which includes (a) the quantized samples in the signal blocks and (b) (i) bit allocation information denoting how many bits each of the quantized samples in the signal blocks were quantized by and/or (ii) scale factor information relating to scale factors for the signal blocks, included in successive frames of the second digital signal, control signal generating means for generating a control signal if an error exists in the signal information which could not be corrected by said error correction means, said control signal generating means being adapted to generate a first control signal if an uncorrected error exists in a quantized sample in the signal information;

derivation means for deriving (a) the quantized samples in the signal blocks and (b) (i) the bit allocation information and/or the scale factor information, and producing replicated samples in the signal blocks which substantially correspond to the samples in the signal blocks of the sub-band signals;

error masking means for either (a) replacing the quantized sample having the uncorrected error with a quantized sample having a zero amplitude or (b) causing a replicated sample having a zero amplitude to be produced as a result of the quantized sample having the uncorrected error; and synthesis filter means for constructing a replica of the wide-band digital signal in response to the replicated samples in the signal blocks.

2. The receiver as claimed in claim 1, wherein the signal information includes the scale factor information, said control signal generating means is further adapted to generate a second control signal if an uncorrected error exists in a scale factor for a signal block in the signal information, and said error masking means is further adapted to replace the scale factor having the uncorrected error with an extrapolated value from one or more scale factors belonging to one or more preceding signal blocks of the same sub-band signal as the signal block which has the scale factor having the uncorrected error if the second control signal is generated.

3. The receiver as claimed in claim 1, wherein the signal information includes the scale factor information, said control signal generating means is further adapted to generate a second control signal if an uncorrected error exists in a scale factor for a signal block in the signal information, and said error masking means is further adapted to replace the scale factor having the uncorrected error with a value equal to the scale factor of a preceding signal block of the same sub-band signal as the signal block which has the scale factor having the uncorrected error if the second control signal is generated.

4. The receiver as claimed in claim 1, wherein the signal information includes the bit allocation information, said control signal generating means is further adapted to generate a second control signal if there is an uncorrected error in the bit allocation information in a frame of the second digital signal, and said error masking means is further adapted to either (a) reiterate the signal information of a frame preceding the frame having the uncorrected error in the bit allocation information therein in place of the signal information of the frame having the uncorrected error in the bit allocation information therein or (b) reproduce the replicated samples produced for the signal information of the frame preceding the frame having the uncorrected error in the bit allocation information therein if said control signal generating means has generated the second control signal for the frame having the uncorrected error in the bit allocation information therein but not for the frame preceding that frame.

5. The receiver as claimed in claim 1, wherein the signal information includes the bit allocation information, said control signal generating means is further adapted to generate a second control signal if there is an uncorrected error in the bit allocation information in a frame of the second digital signal, and said error masking means is further adapted to either (a) replace all of the samples in the signal blocks of the frame having the uncorrected error in the bit allocation information therein with quantized samples having zero amplitudes or (b) cause replicated samples having zero amplitudes to be produced in all of the signal blocks of the frame which has the bit allocation information having the uncorrected error therein if said control signal generating means has generated the second control signal for the frame having the uncorrected error in the bit allocation information therein and for the frame preceding that frame.

6. The receiver as claimed in claim 1, wherein the signal information further includes synchronization signals such that a synchronization signal is included in each of the frames of the second digital signal, said control signal generating means is further adapted for generating a second control signal if an uncorrected error exists in the synchronization signal in a frame of the second digital signal, and said error masking means is further adapted to either (a) replace all of the quantized samples in the signal blocks of the frame having the synchronization signal which has the uncorrected error with quantized samples having zero amplitudes or (b) cause replicated samples having zero amplitudes to be produced in all of the signal blocks of the frame having the synchronization signal which has the uncorrected error if said control signal generating means has generated the second control signal for the frame having the synchronization signal which has the uncorrected error and for the frame preceding that frame.

7. The receiver as claimed in claim 1, wherein the signal information includes the bit allocation information and the scale factor information, each frame of the second digital signal includes only one time-equivalent signal block of each of the sub-band signals, and the bit allocation information and the scale factor information relating thereto.

8. The receiver as claimed in claim 1, wherein said receiving means is adapted to receive the first digital signal from a track of a record carrier.

9. The receiver as claimed in claim 8, wherein said record carrier is a magnetic record carrier.

10. A receiver, comprising:
    receiving means for receiving a first digital signal representing a wide-band digital signal which has been encoded into sub-band signals which are each made up of successive signal blocks having a predetermined number of samples of that sub-band signal, the samples in the signal blocks of the sub-band signals having been quantized to produce quantized sub-band signals in the signal blocks;
    error correction means for correcting errors in and converting the first digital signal into a second digital signal having signal information, which includes the quantized samples in the signal blocks and scale factor information relating to scale factors for the signal blocks, included in successive frames of the second digital signal;
    control signal generating means for generating a control signal if an error exists in the signal information which could not be corrected by said error correction means, said control signal generating means being adapted to generate the control signal if an uncorrected error exists in a scale factor for a signal block of the signal information;
    error masking means for replacing the scale factor having the uncorrected error with an extrapolated value from one or more scale factors belonging to one or more preceding signal blocks of the same sub-band signal as the signal block which has the scale factor having the uncorrected error if the control signal is generated;
    derivation means for deriving the quantized samples in the signal blocks and the scale factor information relating thereto from the signal information, and producing replicated samples in the signal blocks which substantially correspond to the samples in the signal blocks of the sub-band signals; and
    synthesis filter means for constructing a replica of the wide-band digital signal in response to the replicated samples in the signal blocks.

11. The receiver as claimed in claim 10, wherein the extrapolation value is equal to the scale factor of the preceding signal block.

12. A digital transmission system, comprising: a transmitter having
    first encoding means for receiving a wide-band digital signal, said first encoding means including (i) sub-band coding means for generating a plurality of sub-band signals from the wide-band digital signal, each of the sub-band signals being made up of consecutive signal blocks which each contain a predetermined number of samples of that sub-band signal; (ii) quantization means for quantizing the samples in the signal blocks of the sub-band signals to produce quantized samples in the signal blocks; (iii) bit allocation means for generating bit allocation information denoting how many bits the samples in each of the signal blocks are to be quantized by; and
(iv) scale factor information generating means for generating scale factor information relating to scale factors for the signal blocks;

combining means for combining the quantized samples in the signal blocks and (b) (i) the bit allocation information and (ii) the scale factor information relating thereto in successive frames of a second digital signal;

second encoding means for converting the second digital signal into a third digital signal which is error correction encoded; and application means for applying the third digital signal to a transmission medium; and a receiver having receiving means for receiving a replicated third digital signal from said transmission medium which substantially corresponds to the third digital signal applied to the transmission medium;

error correction means for correcting errors in and converting the replicated third digital signal into a replicated second digital signal which substantially corresponds to the second digital signal, the replicated second digital signal having signal information, which includes (a) the quantized samples in the signal blocks and (b) (i) the bit allocation information and (ii) the scale factor information relating thereto, included in successive frames of the replicated second digital signal;

control signal generating means for generating a control signal if an error exists in the signal information which could not be corrected by said error correction means, said control signal generating means being adapted to generate a first, control signal if an uncorrected error exists in a quantized sample in the signal information;

derivation means for deriving (a) the quantized samples in the signal blocks and (b) (i) the bit allocation information and (ii) the scale factor information relating thereto from the signal information, and producing replicated samples in the signal blocks which substantially correspond to the samples in the signal blocks of the sub-band signals;

error masking means for either (a) replacing the quantized sample having the uncorrected error with a quantized sample having a zero amplitude or (a) causing a replicated sample having a zero amplitude to be produced as a result of the quantized sample having the uncorrected error; and synthesis filter means for constructing a replica of the wide-band digital signal in response to the replicated samples in the signal blocks.

13. The system as claimed in claim 12, wherein said control signal generating means is further adapted to generate a second control signal if there is an uncorrected error in the bit allocation information in a frame of the replicated second digital signal, and said error masking means is further adapted to either (a) reiterate the signal information of a frame preceding the frame having the uncorrected error in the bit allocation information therein in place of the signal information of the frame having the uncorrected error in the bit allocation information therein or (b) reproduce the replicated samples produced for the signal information of the frame preceding the frame having the uncorrected error in the bit allocation information therein if said control signal generating means has generated the second control signal for the frame having the uncorrected error in the bit allocation information therein but not for the frame preceding that frame.

14. The system as claimed in claim 12, wherein said control signal generating means is further adapted to generate a second control signal if there is an uncorrected error in the bit allocation information in a frame of the replicated second digital signal, and said error masking means is further adapted to either (a) replace all of the samples in the signal blocks of the frame having the uncorrected error in the bit allocation information therein with quantized samples having zero amplitudes or (b) cause replicated samples having zero amplitudes to be produced in all of the signal blocks of the frame which has the bit allocation information having the uncorrected error therein if said control signal generating means has generated the second control signal for the frame having the uncorrected error in the bit allocation information therein and for the frame preceding that frame.

15. The system as claimed in claim 12, wherein said control signal generating means is further adapted to generate a second control signal if an uncorrected error exists in a scale factor for a signal block in the signal information, and said error masking means is further adapted to replace the scale factor having the uncorrected error with an extrapolated value from one or more scale factors belonging to one or more preceding signal blocks of the same sub-band signal as the signal block which has the scale factor having the uncorrected error if the second control signal is generated.

16. The receiver as claimed in claim 12, wherein said control signal generating means is further adapted to generate a second control signal if an uncorrected error exists in a scale factor for a signal block in the signal information, and said error masking means is further adapted to replace the scale factor having the uncorrected error with a value equal to the scale factor of a preceding signal block of the same sub-band signal as the signal block which has the scale factor having the uncorrected error if the second control signal is generated.

17. The system as claimed in claim 12, wherein the signal information further includes synchronization signals such that a synchronization signal is included in each of the frames of the replicated second digital signal, said control signal generating means is further adapted for generating a second control signal if an uncorrected error exists in the synchronization signal in a frame of the second digital signal, and said error masking means is further adapted to either (a) replace all of the quantized samples in the signal blocks of the frame having the synchronization signal which has the uncorrected error with quantized samples having zero amplitudes or (b) cause replicated samples having zero amplitudes to be produced in all of the signal blocks of the frame having the synchronization signal which has the uncorrected error if said control signal generating means has generated the second control signal for the frame having the synchronization signal which has the uncorrected error and for the frame preceding that frame.

18. The system as claimed in claim 12, wherein each frame of the second and the replicated second digital signals includes only one time-equivalent signal block of each of the sub-band signals, and the bit allocation information and the scale factor information relating thereto.

19. The system as claimed in claim 12, wherein said transmission medium is a record carrier, and said receiving means is adapted to receive the replicated third digital signal from a track of said record carrier.

20. The system as claimed in claim 19, wherein said record carrier is a magnetic record carrier.

* * * * *